United States Patent
Li et al.

(10) Patent No.: US 12,118,359 B2
(45) Date of Patent: Oct. 15, 2024

(54) METHOD AND SYSTEM FOR OPTIMIZING ADDRESS CALCULATIONS

(71) Applicant: HUAWEI TECHNOLOGIES CO., LTD., Guangdong (CN)

(72) Inventors: Weiwei Li, Toronto (CA); Guansong Zhang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/325,474

(22) Filed: May 20, 2021

(65) Prior Publication Data
US 2022/0374236 A1    Nov. 24, 2022

(51) Int. Cl.
*G06F 9/355* (2018.01)
*G06F 9/30* (2018.01)
*G06F 9/38* (2018.01)

(52) U.S. Cl.
CPC .......... *G06F 9/355* (2013.01); *G06F 9/30112* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 6,049,667 A | 4/2000 | Bates | |
| 6,745,318 B1* | 6/2004 | Mansingh | G06F 9/30036 |
| | | | 712/E9.071 |
| 6,813,699 B1* | 11/2004 | Belgard | G06F 12/1036 |
| | | | 711/204 |
| 7,278,137 B1* | 10/2007 | Fuhler | G06F 8/4434 |
| | | | 717/151 |
| 7,493,610 B1* | 2/2009 | Onodera | G06F 9/4484 |
| | | | 714/38.14 |
| 2003/0037220 A1* | 2/2003 | Anvin | G06F 9/30101 |
| | | | 712/E9.024 |
| 2008/0229073 A1* | 9/2008 | Symes | G06F 9/355 |
| | | | 712/E9.004 |
| 2021/0200860 A1* | 7/2021 | Gendler | G06F 21/56 |

FOREIGN PATENT DOCUMENTS

| | | |
|---|---|---|
| CN | 1306245 A | 8/2001 |
| CN | 104641350 A | 5/2015 |
| CN | 106406972 A | 2/2017 |
| WO | 2019046723 A1 | 3/2019 |

OTHER PUBLICATIONS

International Search Report and Written Opinion issued in co-pending International application No. PCT/CN2022/081663 on Jun. 16, 2022.

* cited by examiner

*Primary Examiner* — Yaima Rigol
*Assistant Examiner* — Alexander J Yoon
(74) *Attorney, Agent, or Firm* — BCF LLP

(57) ABSTRACT

The disclosed systems, structures, and methods are directed to optimizing address calculations in a computer. This is achieved in a compiler that identifies an address calculation in code that is being compiled and transforms the code by splitting the address calculation into a first portion in which an offset is determined and a second portion, in which the offset is combined with a base pointer to generate an address. The address and the base pointer have a first bit-length, and the offset has a second bit-length shorter than the first bit-length. The offset is determined using an operation performed at the second bit-length. In some implementations the first bit-length is 64 bits and the second bit-length is 32 bits.

18 Claims, 5 Drawing Sheets

```
struct test_st{ char a[32][32]; };
__kernel void test(__global struct test_st* src, __global char* dst,
                   int x, int y){
    for (int i=0; i<2; ++i){
        for (int j=0; j<2; ++j){
            dst[i*2+j] = src->a[x+i][y+j];
        }
    }
    dst[x*y] = src->a[x][y];
}
```

500

502

504

```
%idxprom.i = sext i32 %7 to i64
%idxprom5.i = sext i32 %6 to i64
%arrayidx6.i = getelementptr inbounds %struct.test_st, %struct.test_st addrspace(1)* %2, i64 0,
               i32 0, i64 %idxprom5.i, i64 %idxprom.i
...
%arrayidx6.1.i = getelementptr inbounds %struct.test_st, %struct.test_st addrspace(1)* %2, i64 0,
                 i32 0, i64 %idxprom5.i, i64 %idxprom.i.1
%arrayidx6.134.i = getelementptr inbounds %struct.test_st, %struct.test_st addrspace(1)* %2,
                   i64 0, i32 0, i64 %idxprom5.1.i, i64 %idxprom.i
%arrayidx6.1.1.i = getelementptr inbounds %struct.test_st, %struct.test_st addrspace(1)* %2,
                   i64 0, i32 0, i64 %idxprom5.1.i, i64 %idxprom.i.1
...
%mul.i = mul nsw i32 %6, %7
%idxprom18.i = sext i32 %mul.i to i64
%arrayidx19.i = getelementptr inbounds i8, i8 addrspace(1)w %5, i64 %idxprom18.i
```

METHOD AND SYSTEM FOR OPTIMIZING ADDRESS CALCULATIONS

CROSS-REFERENCE TO RELATED APPLICATIONS

This is the first filing related to the disclosed technology. At the time of filing, there are no related patents or applications.

TECHNICAL FIELD

The present disclosure relates generally to the field of address calculations in a computer, and more particularly to compiler methods and systems for optimizing address calculations for addresses of elements in memory objects, such as arrays.

BACKGROUND

A pointer represents an address in the memory of a computer. The bit-length of a pointer to an address in global memory varies, depending on the architecture of the computer or processor. For example, in a 32-bit architecture, the pointer length is 32 bits, while in a 64-bit architecture, the pointer length is 64 bits. Most current machine architectures are 64-bit architectures, though it remains desirable for such architectures to be able to handle older 32-bit applications.

Accessing an element of a memory object, such as an element of an array, typically involves use of a pointer, which points to the memory location (i.e., the address) of the element. The address is usually calculated using a base address of the memory object and an offset from the base address for the particular element that is being accessed. For a 64-bit architecture, this address calculation is typically handled using 64-bit arithmetic operations, which usually include addition, multiplication, and bitwise shift operations. Division, subtraction, and other operations may also be used in some address calculations.

Unfortunately, 64-bit operations often require more hardware or processor resources than do 32-bit operations both in terms of latency and register usage. For multiplication, which is one of the most common operations in address calculations, there is often a large difference in resource usage between 32-bit multiplication and 64-bit multiplication. Additionally, 64-bit pointers consume twice as many registers as 32-bit pointers. Because address calculations are very common, and often take place inside of loops, even relatively minor differences in the efficiency of an address calculation may result in large differences in the efficiency of code.

As a further problem with performing address calculations using 64-bit operations, some current architectures do not natively support 64-bit integer operations. This means that 64-bit operations must be implemented using numerous 32-bit operations. For example, on one such architecture, a 64-bit multiply is implemented using six 32-bit operations. Because of this, 64-bit operations on such architectures may take several times as long to execute as 32-bit operations.

SUMMARY

To address the problems discussed above, the present disclosure provides an optimizer for use in a compiler to permit address calculations to be split into an offset calculation that can be carried out using 32-bit operations. The 32-bit offset is then combined with a 64-bit base pointer to produce a 64-bit address of an element in a memory object, such as an array. By splitting an address calculation in this manner, the offset calculation can be carried out using 32-bit instructions and registers, thereby reducing the hardware resources that are used to execute code. Additionally, by splitting address calculations in this manner, the calculations used for the offset calculation are exposed. This can provide increased optimization opportunities, both for arithmetic operation optimizations and for improved choice of architecture-specific instructions to carry out the address calculations. In combination, this can result in significant improvements in the speed and efficiency of operation of code executing on a computer.

In accordance with one aspect of the present disclosure, the technology is implemented in an apparatus including a processor, a memory coupled to the processor, and a compiler residing in the memory and executed by the processor. The compiler includes an address calculation optimizer that includes an address calculation separation module that identifies an address calculation in code that is being processed in the compiler, and that splits the address calculation into a first portion in which an offset is determined and a second portion, in which the offset is combined with a base pointer to generate an address. The address and the base pointer have a first bit-length, and the offset has a second bit-length shorter than the first bit-length. The offset is determined using an operation performed at the second bit-length.

In some implementations, the first bit-length is 64 bits and the second bit-length is 32 bits. It will be understood that other bit-lengths are also possible.

In some implementations, the address calculation optimizer further includes a fast-address check module that determines whether to enable a fast-address mode that permits use of the address calculation separation module. In some of these implementations, the fast-address check module determines whether to enable the fast-address mode based at least in part on input from a user of the compiler.

In some implementations, the compiler is configured to produce a first binary using the address calculation optimizer and a second binary without using the address calculation optimizer. A runtime environment determines whether to use the first binary or the second binary based, at least in part, on a runtime determination of whether memory objects used in the code fit within memory areas that can be accessed using an offset of the second bit-length.

In some implementations, the address calculation optimizer is configured to generate first generated code in which the offset is computed using an operation at the first bit-length, and second generated code in which the offset is computed using an operation at the second bit-length. Control flow code is also generated to determine, when the code is executed, whether to use the first generated code or the second generated code. In some of these implementations, the control flow includes a conditional expression that uses a number of leading zeros in a value having the second bit-length to determine whether to use the first generated code or the second generated code.

In some implementations, the address calculation optimizer further includes a general arithmetic operation optimization module that applies an arithmetic optimization to at least the first portion of the address calculation. Examples of such arithmetic optimizations include common subexpression elimination and strength reduction.

In some implementations, the address calculation optimizer further includes an architecture-specific instruction selection module that selects machine instructions for the first portion and the second portion of the address calculation. The machine instructions correspond to instructions of a machine architecture that is targeted by the compiler. In some of these implementations, the architecture-specific instruction selection module selects between sets of instructions based, at least in part, on weights of the machine instructions.

In accordance with another aspect of the present disclosure, a method of optimizing address calculations in a computer is provided. The method includes identifying, by a compiler executing on the computer, an address calculation in code that is being compiled, and transforming the code, in an address calculation separation module of the compiler, by splitting the address calculation into a first portion in which an offset is determined and a second portion, in which the offset is combined with a base pointer to generate an address. The address and the base pointer have a first bit-length, and the offset has a second bit-length shorter than the first bit-length. The offset is determined using an operation performed at the second bit-length. In some implementations the first bit-length is 64 bits and the second bit-length is 32 bits.

In some implementations, the method further includes determining, in a fast-address check module, whether to enable a fast-address mode that permits use of the address calculation separation module. In some of these implementations, this includes determining whether to enable the fast-address mode based at least in part on input from a user of the compiler.

In some implementations, the method further includes applying, by a general arithmetic operation optimization module, an arithmetic optimization to at least the first portion of the address calculation. Examples of such arithmetic optimizations include common subexpression elimination and strength reduction.

In some implementations, the method further includes selecting, in an architecture-specific instruction selection module, machine instructions for the first portion and the second portion of the address calculation, the machine instructions corresponding to instructions of a machine architecture that is targeted by the compiler. In some of these implementations, this includes selecting between sets of instructions based, at least in part, on weights of the machine instructions.

In accordance with a still further aspect of the disclosure, the disclosed technology may be implemented as instructions encoded on a computer-readable medium. When these instructions are executed by a processor, they cause the processor to perform operations, including causing the processor to identify an address calculation in code that is being processed in a compiler and split the address calculation into a first portion in which a 32-bit offset is determined and a second portion, in which the offset is combined with a 64-bit base pointer to generate a 64-bit address. The instructions also cause the processor to select between sets of machine instructions for the first portion and the second portion of the address calculation based, at least in part, on weights of the machine instructions, the machine instructions corresponding to instructions of a machine architecture that is targeted by the compiler.

BRIEF DESCRIPTION OF THE FIGURES

The features and advantages of the present disclosure will become apparent from the following detailed description, taken in combination with the appended drawings, in which:

FIGS. 5A and 5B show example source code, along with code in an intermediate representation, to illustrate the operation of an address calculation separation module in accordance with various implementations of the disclosed technology.

Figure 1:
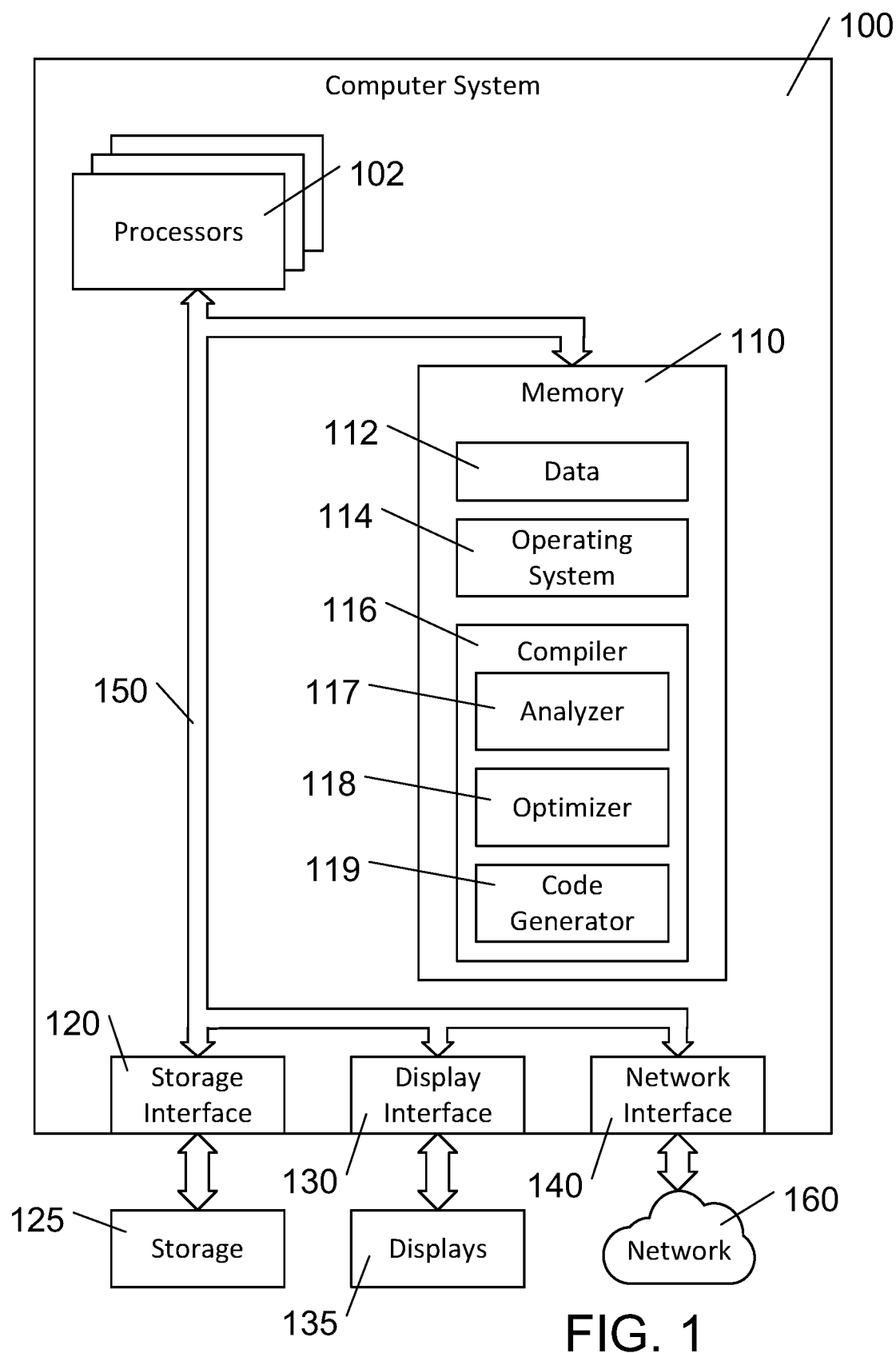
FIG. 1 is a block diagram of a computer system including a compiler that implements the address calculation optimizations of the disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the disclosed technology will be described more fully hereinafter with reference to the accompanying drawings. The present technology may, however, be embodied in many different forms and should not be construed as limited to the representative embodiments set forth herein. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

It should also be noted that as used herein, the term "optimize" means to improve. It is not used to convey that the technology produces the objectively "best" solution, but rather that an improved solution is produced. In the context of memory access, it typically means that the efficiency or speed of memory access may be improved.

As used herein, the term "determine" generally means to make a direct or indirect calculation, computation, decision, finding, measurement, or detection. In some cases, such a determination may be approximate. Thus, determining a value indicates that the value or an approximation of the value is directly or indirectly calculated, computed, decided upon, found, measured, detected, etc. If an item is "predetermined" it is determined at any time prior to the instant at which it is indicated to be "predetermined."

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and forwards the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable program instructions. These computer-readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to produce a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

FIG. 1 shows a computer system 100 that includes a compiler 116, as described in greater detail below. As will be understood by one of ordinary skill in the art, a compiler, such as the compiler 116, is generally a computer program that translates computer code written in one programming language (referred to as the "source code", written in the "source language") into computer code in another programming language (the "object code" or "target code", expressed in the "target language"). Typically, the source language will be a relatively "high-level" language (i.e., a language that can be read by humans possessing knowledge of the programming language), such a "C", "C++", "Java", "Rust", "Go", or many others. The target language will often be a binary "machine language" that can be executed by a computer implementing a particular hardware architecture or an "assembly language" which represents the machine language code in a more human-readable form. Alternatively, the target language may be an intermediate form, that, while closer to machine language than the source language, still is not specific to a single hardware architecture. In some cases, the target language may even be a different high-level language.

The computer system 100 may be a multi-user server or computer, a single user computer, a laptop computer, a tablet computer, a smartphone, an embedded control system, or any other computer system currently known or later developed. As shown in FIG. 1, the computer system 100 includes one or more processors 102, a memory 110, a storage interface 120, a display interface 130, and a network interface 140. These system components are interconnected via a bus 150.

The memory 110 may contain data 112, an operating system 114, and a compiler 116. The data 112 may be any data that serves as input to or output from any program in the computer system 100. The operating system 114 is an operating system such as MICROSOFT WINDOWS or LINUX. The compiler 116 includes an analyzer 117, which generates an intermediate representation from a human-readable source language, an optimizer 118, which optimizes code in the intermediate representation, and a code generator 119, which typically generates assembly or machine code that may be executed by a target computer. Notably, the optimizer 118 may include code that optimizes memory address calculations, as is described in greater detail below. It will be understood by those of ordinary skill in the art that although the compiler 116 is shown as executing on the computer system 100, it is possible that the compiler 116 could execute on numerous computer systems, connected, e.g., by a network. Further, the analyzer 117, optimizer 118, and code generator 119 may reside on different computer systems. Additionally, it will be understood that although the compiler 116 is shown as executing on the computer system 100, the code that is generated by the compiler 116 need not be targeted to the computer system 100, but could instead be code for a different computer system architecture.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the compiler 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114. The processors 102 may also execute instructions that make up the compiler 116.

The display interface 130 is used to connect one or more displays 135 to the computer system 100. These displays 135, which may include, e.g., terminals, monitors, keyboards, pointer devices, touchscreens, and/or other human interface devices, provide the ability for users to interact with the computer system 100. Note, however, that although the display interface 130 is provided to support communication with one or more displays 135, the computer system 100 does not necessarily require a display 135, because all needed interaction with users may occur via the network interface 140.

The network interface 140 is used to connect the computer system 100 to other computer systems or networked devices (not shown) via a network 160. The network interface 140 may include a combination of hardware and software that allows communicating on the network 160. The software in the network interface 140 may include software that uses one or more network protocols to communicate over the network 160. For example, the network protocols may include TCP/IP (Transmission Control Protocol/Internet Protocol). In some implementations, the network interface 140 may be an Ethernet adapter.

It will be understood that the computer system 100 is merely an example and that the compiler and optimizer according to the disclosed technology may execute on computer systems or other computing devices having different configurations.

Figure 2:
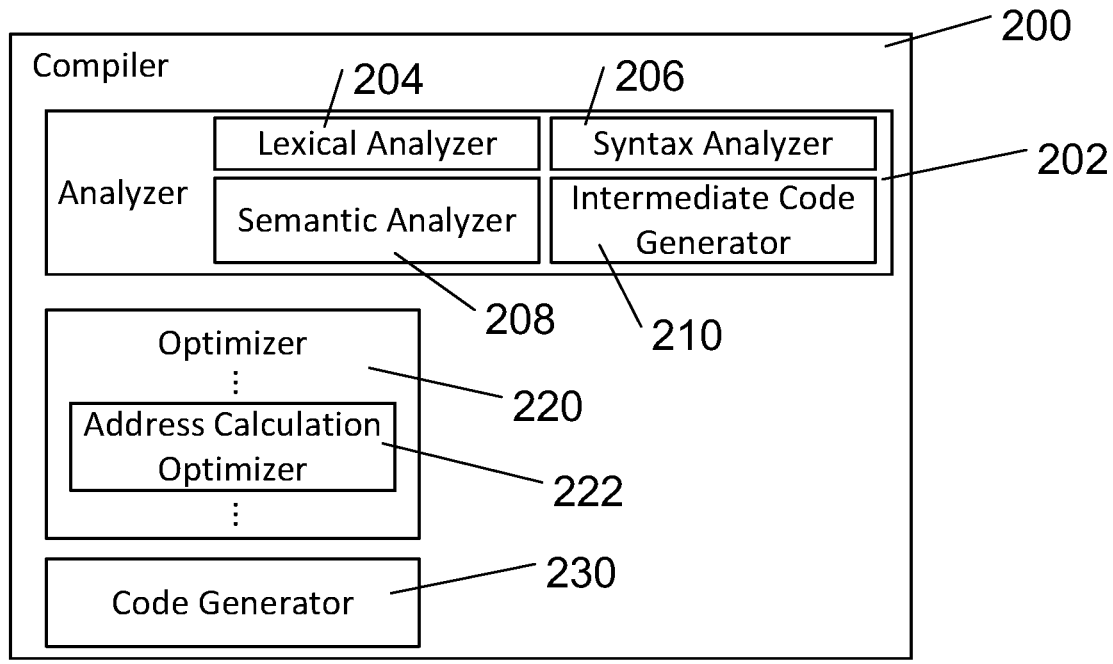
FIG. 2 illustrates a compiler including the address calculation optimizer of the disclosure.

FIG. 2 shows a block diagram of a compiler in accordance with one implementation of the technology. The compiler 200 includes an analyzer module 202, an optimizer module 220, and a code generator module 230.

The analyzer module 202 includes a lexical analyzer module 204, a syntax analyzer module 206, a semantic analyzer module 208, and an intermediate code generator module 210. The analyzer module 202 translates source code in a high-level language, such as "C" or "C++" into an intermediate representation. While the details of the analyzer module 202 and its component sub-modules will vary depending on the high-level language that is being compiled and the intermediate representation that is being used, the operation and implementation of the analyzer module 202 follows well-known principles of compiler design and could be implemented according to these principles by one of ordinary skill in the art. It should be noted that the examples shown herein are generally written in a modified version of the "C" programming language known as the "OpenCL C programming language," and are translated in the intermediate code generator module 210 to the LLVM IR intermediate representation (an intermediate representation defined as part of the LLVM Compiler Infrastructure, an open source project administered by the LLVM Foundation). It will be understood that other languages could be compiled and other intermediate representations could be used without departing from the principles of the technology described herein.

Once the source code has been translated to an intermediate representation, the intermediate representation undergoes a variety of optimizations in the optimizer module 220. In accordance with an implementation of the technology of the present disclosure, the optimizer module may include an address calculation optimizer 222, as described herein. It will be understood that the optimizer module 220 may include many other optimizations. However, since one non-exclusive focus of the present disclosure is optimizing the address calculation, this is the optimization that will be described in the greatest detail herein.

The code generator module 230 translates from the optimized intermediate representation code to output code in, e.g., an assembly language or machine code. The output code may be ready to execute or may need to undergo further steps, such as linking or even further compilation to execute on a target computer. The output code may be specific to a target architecture.

The details of generating assembly or machine code from optimized intermediate representation code will vary, depending on the intermediate representation and the target architecture. The methods of generating assembly or machine code from an intermediate representation are generally well-known to those of ordinary skill in the art. It will further be understood that in some implementations, the code generator module 230 may produce code in another intermediate representation, or even in a different high-level programming language rather than generating assembly or machine code. It should be noted that because the address calculation optimizer 222 may be closely linked to the target architecture, in some implementations, the address calculation optimizer 222 may be a part of the code generator module 230.

It will be understood that in some implementations, the structure for the compiler shown in FIG. 2 may vary. For example, in some implementations, portions of the optimization could be performed on the source code, rather than on the intermediate representation. In such implementations, there may be some optimizations, possibly including all or part of the address calculation optimizer 222, that may take place within an optimization sub-module (not shown) of the analyzer module 202 or within an optimization sub-module (not shown) of the code generator module 230.

Figure 3:
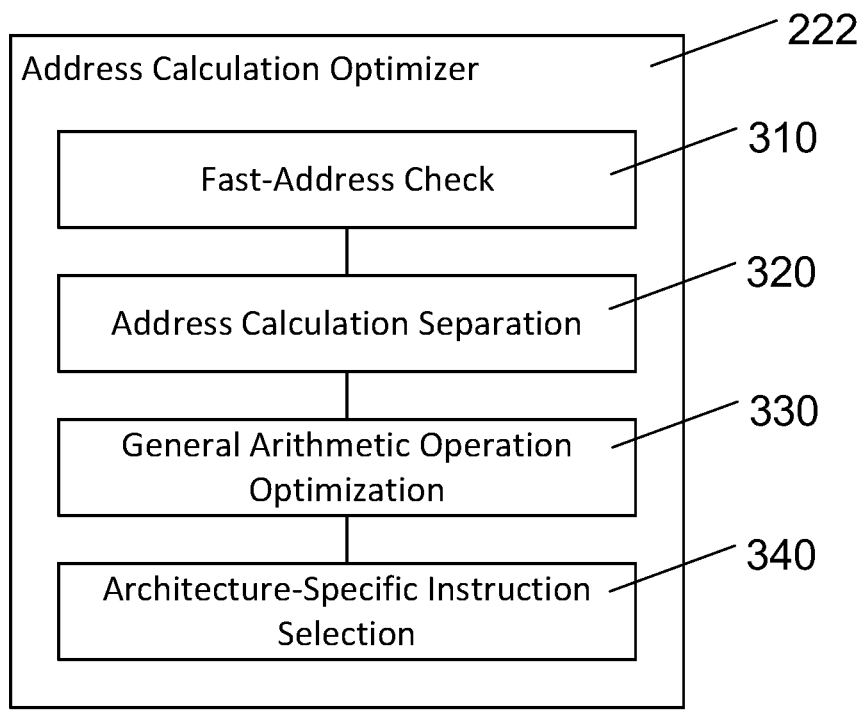
FIG. 3 is a block diagram showing the operation of the address calculation optimizer of the disclosure.

Referring now to FIG. 3, the operation of the address calculation optimizer 222 is described in greater detail. The address calculation optimizer 222 includes a fast-address check module 310, an address calculation separation module 320, a general arithmetic optimization module 330, and an architecture-specific instruction selection module 340.

The fast-address check module 310 checks whether the compiler can enable the address calculation optimization (also referred to herein as "fast-address mode"). The primary requirement for enabling fast-address mode is that the offsets fit within 32 bits. This means that the offsets should generally be in the range $-2^{31}$ to $2^{31}-1$ (though it should be noted that in some implementations that support only positive offsets, fast-address mode may be able to be used when the offset is in the range of 0 to $2^{32}-1$). Since the range of the offsets may not be known at compile-time, there are several approaches that may be used to determine whether to enable fast-address mode. The goal of the fast-address check module 310 is to guarantee the correctness of the fast-address mode, by enabling the fast-access mode when the resulting 32-bit operations will produce the correct results, without, e.g., overflowing the range of a 32-bit value.

In a first approach to making this determination, the fast-address mode is always enabled. This approach will apply when it is not possible for the offsets to be outside of the range of 32-bits, despite being executed on a 64-bit architecture. For example, if 32-bit applications are being executed on a 64-bit architecture, the offsets will not be outside of a 32-bit range. Similarly, if the target systems support no more than 4 gigabytes of memory, then the offsets will be within a 32-bit range. It will be understood that if this "always on" approach is being used, it may be unnecessary to include the fast-address check module 310, since it will always produce the same result, enabling the fast-access mode.

In a second approach to determining whether fast-address mode may be used, a user decides, and instructs the compiler whether the fast-address mode may be used via, e.g., a compilation flag. The user of the compiler will generally know the sizes of the memory objects, such as variables and arrays in a program. If the user knows that the variables and arrays in a program will each fit within a memory area that can be indexed by a 32-bit offset, then the user may choose to apply a compilation flag to instruct the compiler to enable the fast-address mode. Using this approach, the fast-address check module 310 may, e.g., check a flag indicating that the fast-address mode should be enabled.

A third approach to determining whether fast-address mode should be used moves the decision out of the compiler to runtime. The compiler prepares two binaries: one in which the fast-address mode is enabled, and one in which the fast-address mode is disabled. At runtime, there is a decision on which of these two binaries to use. At runtime, the size of a memory object is generally known. If the memory objects fit within memory areas that can be accessed using a 32-bit offset, then the binary with the fast-address mode enabled is used. Otherwise, the binary with the fast-address mode disabled is used. It should be noted that in some implementations, because both binaries will be generated by the compiler, the fast-address check module 310 may be absent in the compiler, but a check at runtime will be added.

Figure 4:
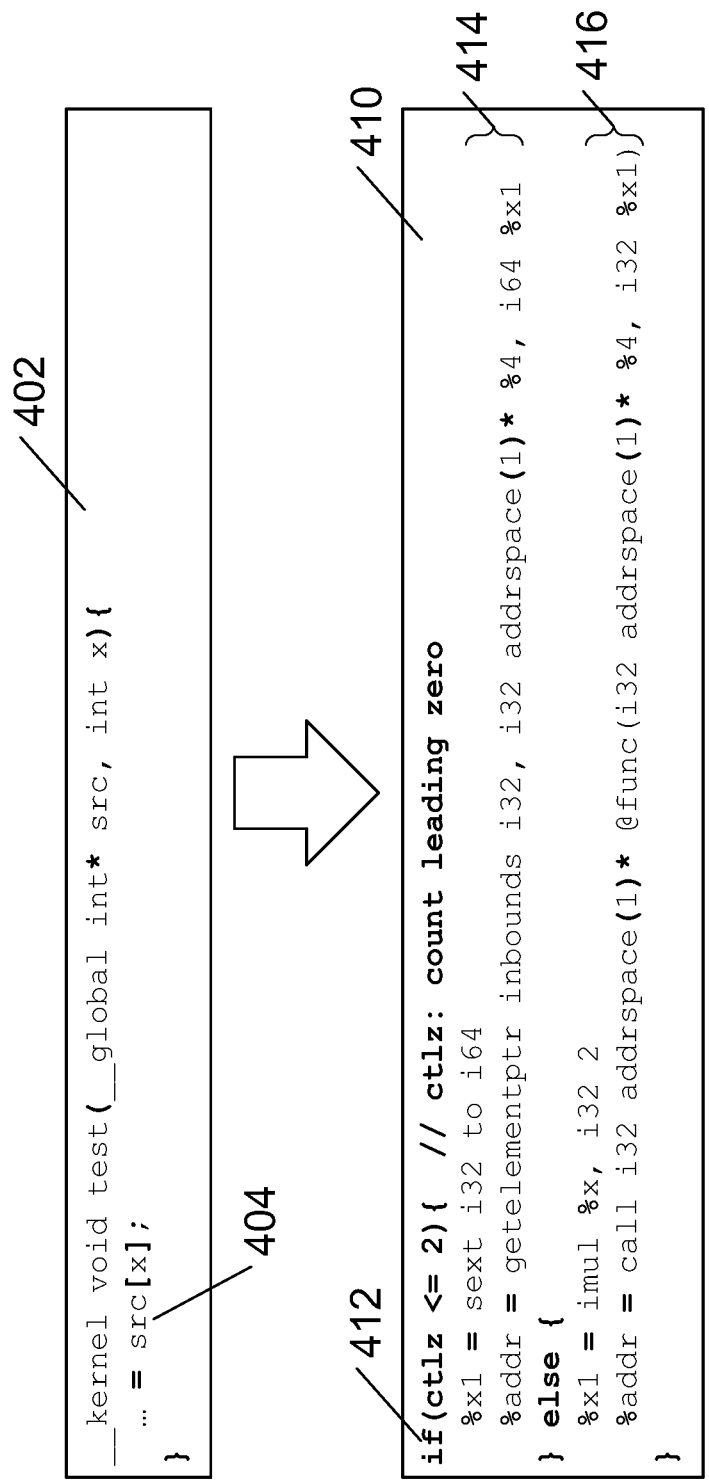
FIG. 4 shows example source code, along with code in an intermediate representation, to illustrate the operation of one method of determining whether to split an address calculation in accordance with various implementations of the disclosed technology.

In a fourth approach to determining whether fast-address mode should be used, the compiler may inject control flow into the code to decide which calculation is used for a pointer. An example of such control flow is shown in FIG. 4, which shows a fragment of source code 402 (written in OpenCL C), and an intermediate representation 410 (in pseudo-code resembling LLVM IR) for the line 404 of the source code 402. As can be seen, in line 404, an array called "src" of integer values is indexed by a variable (also an integer) "x". To access the element of the array, the offset of the indexed value should be calculated, and then should be added to the base address of the array. On a 64-bit architecture, the base address of the array will generally be a 64-bit value, but it is possible that the offset may fit within the range of a 32-bit value. On some architectures, arithmetic operations on 32-bit values may be faster than arithmetic operations on 64-bit values. Therefore, if the offset calculation can be done using 32-bit operations, the code may take less time to execute than if the calculations were done using 64-bit operations.

To take advantage of this potential optimization, the compiler generates the intermediate representation code 410, which includes a conditional expression 412, 64-bit offset calculation code 414, and 32-bit offset calculation code 416. The conditional expression 412 checks the number of leading zeros of the index variable "x". If there are two or fewer leading zeros, then the offset calculation might overflow a 32-bit value. This is the case because the array "src" contains integer values, each of which is multiple bytes in length (typically four bytes in most current C compilers, but other lengths are possible). If the index variable "x" includes (in its binary representation) two or fewer leading zeros, then when the index variable is multiplied by the length of each integer to calculate the offset, the compiler has determined that it may be possible for an overflow to result.

If there are two or fewer leading zeros, then the 64-bit offset calculation code 414 will execute. If there are more than two leading zeros, then the 32-bit offset calculation code 416 will execute. Using conditional branching in the code produced by the compiler will generally save on execution time (depending on how long it takes to execute the conditional operation) but will increase the code size.

It will be understood that the intermediate representation code 410 is merely an example, and the intermediate representation code produced by the compiler may vary depending on the details of the source code, the compiler, and the intermediate representation. It should be noted that the code generated by the compiler under this approach does not depend on the determination of whether it is safe to use fast-address mode. Thus, in some implementations, the fast-address check module 310 may be minimal or may be omitted.

It will be understood that although four approaches to handling a determination of whether to use fast-address mode have been provided, there may be other ways of making this determination. It should further be noted that in some implementations, a user may be able to select which approach should be used.

Referring back to FIG. 3, if it has been determined that code for the fast-address mode is to be generated, the address calculation separation module 320 splits the address calculation into a base pointer as a 64-bit value, and offset calculations as 32-bit operations. Thus, the general pattern for address calculations is:

offset=result of 32-bit operations
address=func(64-bit base pointer, offset)

Figure 5B:
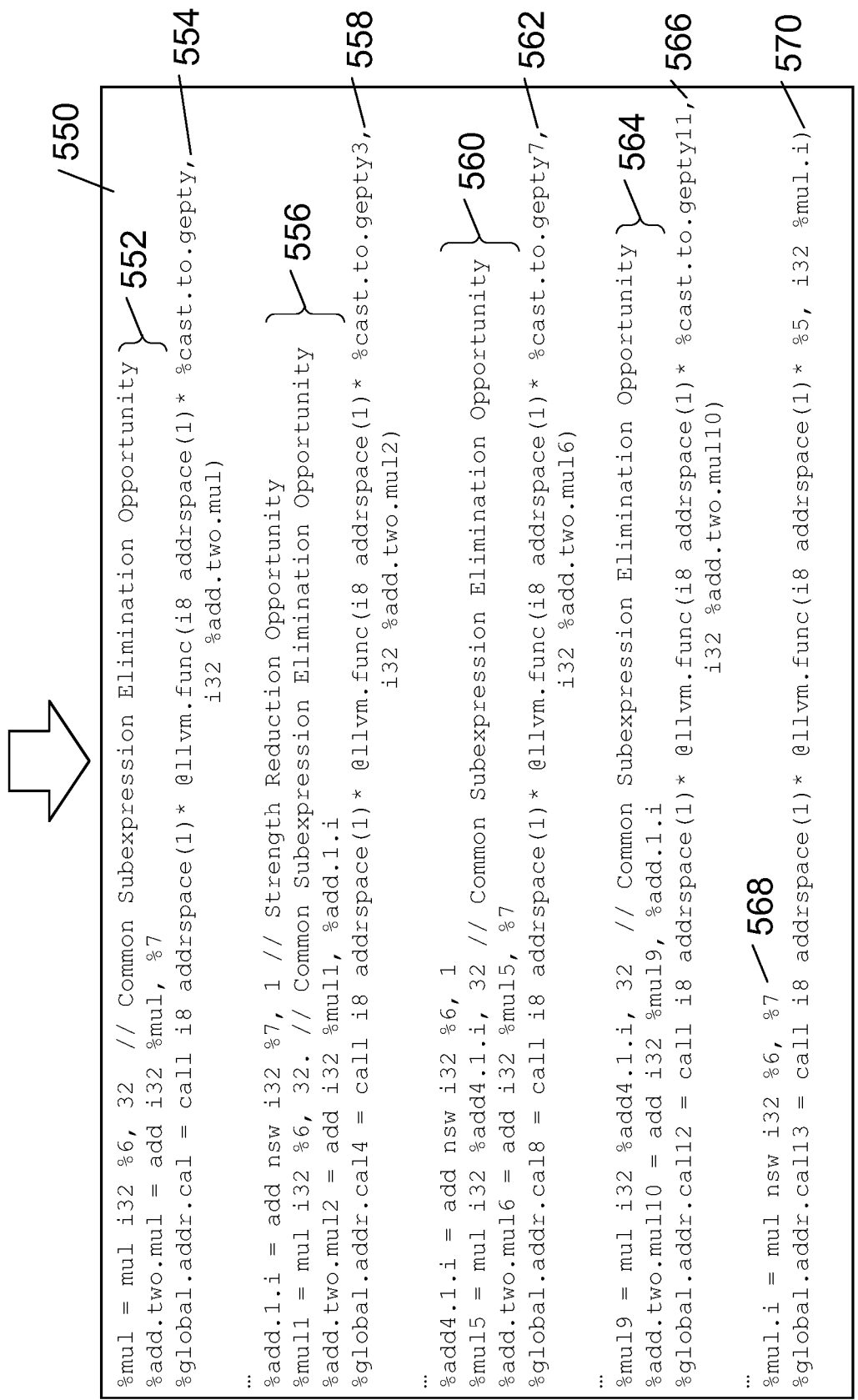

This is illustrated in FIGS. 5A and 5B. FIG. 5A shows a fragment of source code 500 (written in OpenCL C) that is compiled to an intermediate representation 520 (using LLVM IR) in which offset calculations are performed using 64-bit operations. In FIG. 5A, source code 500 includes lines 502 and 504, each of which involves computing offsets to determine an address of data in an array within a structure (i.e., src->a[ . . . ][ . . . ]), and computing offsets to determine an address in an array at which to store results of a calculation (i.e., dst[ . . . ]= . . . ). When the source code 500 is compiled to produce an intermediate representation for a 64-bit architecture, such as the intermediate representation fragments 520, these offset calculations are transformed into "getelementptr" instructions, such as those shown in lines 522, 524, 526, 528, and 530 (each is wrapped to two lines in the figure, for legibility). In LLVM IR, the "getelementptr" instruction is used to get the address of a subelement of an aggregate data structure, such as a "struct" or an array. The "getelementptr" instruction performs address calculation but does not actually access memory (in LLVM IR, a separate instruction, such as a "load" or "store" instruction (not shown) would be used to access memory). Because the source code 500 is being compiled for operation on a 64-bit architecture, the "getelementptr" instruction will yield a 64-bit address, and the address calculations that will ultimately result from translating the "getelementptr" instruction into machine or assembly language will use 64-bit operations.

It will be understood that the "getelementptr" instruction is specific to the LLVM IR intermediate representation. Different intermediate representations will have different instructions that are used in a similar manner. While implementations of the disclosed technology are illustrated using LLVM IR, one of ordinary skill in the art would understand how to apply these principles to other intermediate representations.

In some implementations, the address calculation separation module 320 may be used on an intermediate representation such as is shown in the intermediate representation fragments 520, to split the address calculations into 32-bit offset calculations, and a function that adds the 32-bit offset to a 64-bit base address. An example of this separation of the address calculations is shown in FIG. 5B, which shows intermediate representation fragments 550, after the address calculation separation module 320 has been used. The address calculation separation module 320 has transformed "getelementptr" instructions, such as those shown in lines 522, 524, 526, 528, and 530 of FIG. 5A into blocks of code, each of which includes a 32-bit offset calculation, such as are shown in code 552, 556, 560, 564, and 568, and calls to pre-defined intrinsic functions, such as are shown in lines 554, 558, 562, 566, and 570 (which may be wrapped to two lines in the figure, for legibility).

It should be noted that although the transformed code includes calls to functions, which may have significant overhead, the functions that combine the 64-bit base address with the 32-bit address calculation will generally be inlined—i.e., translated directly into code that performs the function, rather than resulting in a function call with significant overhead. Further, it will be understood that although this optimization is shown as occurring on an intermediate representation to produce a transformed intermediate representation, in some implementations, the address calculation separation module 320 may operate in other stages of the compilation process, such as during translation from an intermediate representation to machine or assembly code.

Referring back to FIG. 3, the general arithmetic optimization module 330 may be applied to the code in which the address calculations have been separated. In addition to reducing operations involved in calculating an offset to 32-bit operations, separating the address calculation into an offset calculation and application of a function that combines the base address with the offset also exposes the steps in the offset calculation. Advantageously, exposing the arithmetic operations involved in the offset calculation may expose additional optimization opportunities for the general arithmetic optimization module 330.

The general arithmetic optimization module 330 applies common general arithmetic optimizations that are well-known in the compiler-related arts. For example, the general arithmetic optimization module 330 may apply common subexpression elimination, an optimization in which instances of identical expressions are identified and may be replaced with a single calculation of the value of the expression. Another example of an optimization that may be performed in the general arithmetic optimization module is strength reduction. Strength reduction is an optimization in which expensive operations are replaced with equivalent but less expensive operations. For example, a multiplication operation (relatively expensive) by a power of two could be replaced with a less expensive bit shift operation, which will produce the same results. An addition operation that is adding one to a variable could be replaced with a less expensive increment operation. While common subexpression elimination and strength reduction are used as examples, there are other well-known arithmetic optimizations that may be applied by the general arithmetic optimization module 330, and the implementation of these optimizations is well-known by those of ordinary skill in the compiler-related arts.

The architecture-specific instruction selection module 340 selects the machine or assembly instructions that are used, based on the final address calculation pattern and on the cost of each instruction in the machine architecture that is being targeted. Generally, for any given machine architecture, each machine or assembly instruction will have a weight or cost, in which a lower weight indicates that the instruction takes fewer cycles to execute and/or uses fewer hardware resources.

For example, suppose that the following instructions relevant to address calculation and having the indicated weights are supported by a processor architecture:

| Instruction | Weight |
|---|---|
| IADDU64 | 2 |
| IMAD32Q | 4 |
| MOV, RSHIFT, LSHIFT, ARSHIFT, OR | 1 |
| MUL | 3 |

Instructions such as MUL (32-bit multiply), MOV, various bit shift instructions, and OR are generally familiar to those skilled in the art. IADDU64 and IMAD32Q are pseudo-instructions that may have different implementations depending on the architecture. By using such pseudo-instructions, architecture-specific optimizations may be applied without changing the generated code. IADDU64 is a pseudo-instruction that adds extends a 32-bit operand to 64 bits and adds it to a 64-bit operand to produce a 64-bit result. IMAD32Q is a pseudo-instruction that multiplies two 32-bit operands and adds the result to a 64-bit operand to produce a result.

Continuing the example, suppose that for an address calculation of the form "base+a*b", there are two options for a set of instructions that could be produced by the compiler: a first option using the IADDU pseudo-instruction, and a second option using the IMAD32Q pseudo-instruction. The option using the IADDU pseudo-instruction produces code of the following form:

MOV R0, a
MOV R1, b
MUL R0, R0, R1
MOV R1, 0.f
IADDU64 temp, R0, C0

The option using the IMADQ pseudo-instruction produces code of the following form:

MOV R0, a
MOV R1, b
IMAD32Q temp, R0, R1, C0

Both of these will produce the same result. The option using IADDU64 uses three MOV instructions, a MUL instruction, and an IADDU64 pseudo-instruction for a total weight of 8. The option using IMAD32Q uses two MOV instructions and an IMAD32Q pseudo-instruction, for a total weight of 6. By evaluating these options that are available on the target architecture, the architecture-specific instruction selection module 340 may select the more efficient set of machine or assembly instructions—in this example, the option using IMAD32Q. It will be understood that even using the same architecture, there may be address calculations in which it may be more efficient, e.g., to use the IADDU64 pseudo-instruction.

Thus, the architecture-specific instruction selection module 340 provides mapping of the optimized address calculation code to a specific architecture. It should be noted that exposing the 32-bit arithmetic operations that are used to calculate the offset, as is done by the address calculation separation module 320, may increase the options that are available to the architecture-specific instruction selection module 340, improving the ability to select an option having a relatively low weight.

It will be understood that the operations and functionality of the address calculation optimizations described herein, while shown with example code written in the OpenCL C programming language and the LLVM IR intermediate representation, could be used with other programming languages and intermediate representations. Additionally, the target architecture is described as being a 64-bit architecture, and 32-bit operations are described as being used for calculating the offset, which is also described as being a 32-bit integer. While this represents the most likely use case at present, the same or similar principles could be used with other bit-lengths, depending on the target architecture.

It will also be understood that, although the embodiments presented herein have been described with reference to specific features and structures, various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An apparatus comprising:
a memory storing instructions;
a compiler comprising an address calculation optimizer incorporating a fast-address check module and an address calculation separation module; and
at least one processor in communication with the memory, the at least one processor configured, upon execution of the instructions and execution of the compiler, to perform the following:
execute the fast-address check module of the compiler to determine whether the compiler is capable of enabling an address calculation optimization fast-address mode based on a predetermined offset bit length limit; and
in response to the fast-address check module determining that the compiler is capable of enabling the fast-address mode, execute the address calculation separation module of the compiler to identify an address calculation in code that is being processed by the compiler, the address calculation separation module configured to split the address calculation into an offset calculation in which an offset is determined and an application of a function in which the offset is combined with a base pointer to generate an address,
wherein the address and the base pointer have a first bit-length, the offset has a second bit-length shorter than the first bit-length, and the offset is determined using an operation performed at the second bit-length.

2. The apparatus of claim 1, wherein the first bit-length is 64 bits and the second bit-length is 32 bits.

3. The apparatus of claim 1, wherein the fast-address check module determines whether to enable the fast-address mode based at least in part on input from a user.

4. The apparatus of claim 1, wherein the compiler is configured to produce a first binary code using the address calculation optimizer and a second binary code without using the address calculation optimizer, and wherein a runtime environment determines whether to use the first binary code or the second binary code based, at least in part, on a runtime determination of whether memory objects used in the code fit within memory areas that can be accessed using the offset of the second bit-length.

5. The apparatus of claim 1, wherein the address calculation optimizer is configured to generate a first generated code in which the offset is computed using an operation in accordance with the first bit-length, generate a second generated code in which the offset is computed using an operation in accordance with the second bit-length, and a control flow to determine-whether to execute the first generated code or the second generated code.

6. The apparatus of claim 5, wherein the control flow comprises a conditional expression that uses a number of leading zeros in an index value to determine whether to use the first generated code or the second generated code, wherein the index variable has the second bit-length.

7. The apparatus of claim 1, wherein the address calculation optimizer further comprises a general arithmetic operation optimization module that applies an arithmetic optimization to at least the offset calculation.

8. The apparatus of claim 7, wherein the arithmetic optimization comprises common subexpression elimination.

9. The apparatus of claim 7, wherein the arithmetic optimization comprises strength reduction.

10. The apparatus of claim 1, wherein the address calculation optimizer further comprises an architecture-specific instruction selection module that selects machine instructions for the offset calculation and the combined offset and base pointer of the address calculation, the machine instructions corresponding to a machine architecture targeted by the compiler.

11. The apparatus of claim 10, wherein the architecture-specific instruction selection module selects between sets of instructions based, at least in part, on weights of the machine instructions.

12. A method of optimizing address calculations in a compiler being executed on a computer in which the compiler comprises an address calculation optimizer incorporating a fast-address check module and an address calculation separation module, the method comprising:
identifying, by the compiler, an address calculation in code that is being compiled;
determining, in the fast-address check module of the compiler, whether to enable a fast-address mode that permits use of the address calculation separation module of the compiler based on a predetermined offset bit length limit; and
in response to the fast-address check module determining that the compiler is capable of enabling the fast-address mode of the compiler, transforming the code in the address calculation separation module by splitting the address calculation into an offset calculation in which an offset is determined and an application of a function in which the offset is combined with a base pointer to generate an address,
wherein the address and the base pointer have a first bit-length, the offset has a second bit-length shorter than the first bit-length, and the offset is determined using an operation performed at the second bit-length.

13. The method of claim 12, wherein the first bit-length is 64 bits and the second bit-length is 32 bits.

14. The method of claim 12, wherein the determining, in the fast-address check module, whether to enable the fast-address mode comprises determining whether to enable the fast-address mode based at least in part on input from a user.

15. The method of claim 12, further comprising applying, by a general arithmetic operation optimization module, an arithmetic optimization to at least the offset calculation.

16. The method of claim 12, further comprising selecting, in an architecture-specific instruction selection module, machine instructions for the offset calculation and the combined offset and base pointer of the address calculation, the machine instructions corresponding to a machine architecture targeted by the compiler.

17. The method of claim 16, wherein the selecting, in the architecture-specific instruction selection module, the machine instructions comprise selecting between sets of instructions based at least in part on weights of the machine instructions.

18. A non-transitory computer-readable medium comprising instructions that, when executed by a processor, cause the processor to: identify an address calculation in code being compiled in a compiler that comprises a fast-address check module and an address calculation separation module; determine, in the fast-address check module of the compiler, whether to enable a fast-address mode that permits use of the address calculation separation module of the compiler based on a predetermined offset bit length limit; in response to the fast-address check module determining that the compiler is capable of enabling the fast-address mode, the address calculation separation module of the compiler splits the address calculation into an offset calculation in which a 32-bit offset is determined and an application of a function in which the offset is combined with a 64-bit base pointer to generate a 64-bit address; and select between sets of machine instructions to generate the 64-bit address with the combined offset and base pointer of the address calculation based, at least in part, on weights of the machine instructions, the machine instructions corresponding to instructions of a machine architecture targeted by the compiler.

* * * * *